March 24, 1964 S. LEWIS 3,126,111
TIRE DOLLY
Filed Aug. 2, 1961
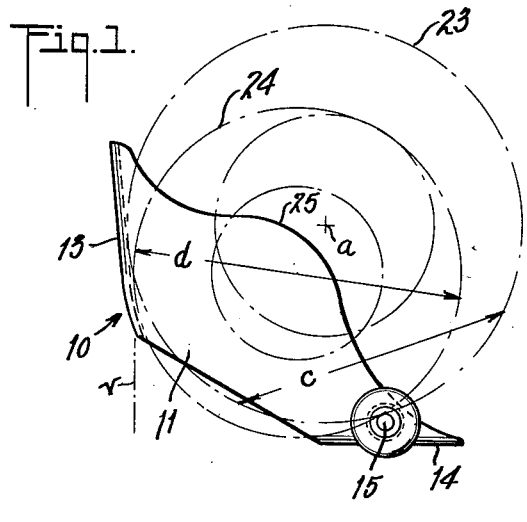
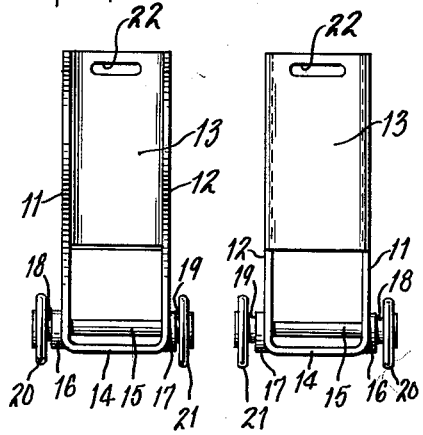
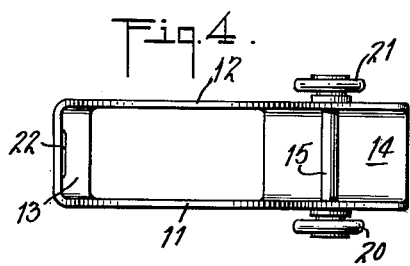
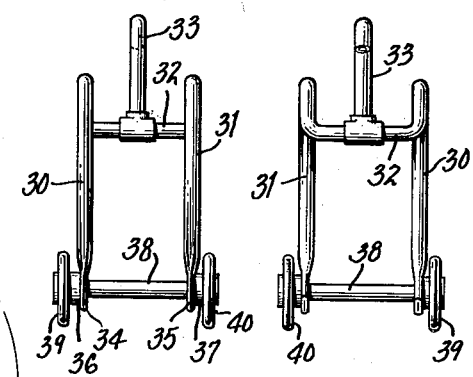
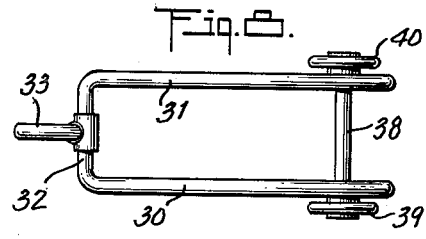
INVENTOR.
SAMUEL LEWIS
BY *Walter S. Oleston*
ATTORNEY United States Patent Office 3,126,111
Patented Mar. 24, 1964

3,126,111
TIRE DOLLY
Samuel Lewis, East Elmhurst, N.Y.
(670 Riverside Drive, New York 31, N.Y.)
Filed Aug. 2, 1961, Ser. No. 128,730
5 Claims. (Cl. 214—334)

The invention relates to a dolly for transporting a tire non-mounted or mounted on a car wheel.

When a tire is being moved from one location to another, the tire, particularly when mounted on a car wheel, is usually rolled on its periphery over the ground. This manner of transporting a tire is frequently inconvenient because it is not always easy to keep the tire in a vertical plane while rolling it along; furthermore, the tire tread gets easily soiled by the uncleanliness of the ground, thus soiling too the operator's hands. There are other drawbacks also involved in the mentioned manner of transporting.

It is an object of the present invention to avoid such drawbacks by the provision of a dolly especially fitted for receiving and transporting a tire.

It is also an object of the invention to provide a dolly for the use of tires of different sizes.

According to one form of the invention, the dolly consists essentially of a sheet-like material, such as a plastic, whereas according to another form the dolly consists mainly of a tubular structure.

Further objects and details of the invention will be apparent from the description given hereinafter and the accompanying drawing illustrating two embodiments thereof by way of example.

In the drawing:

FIG. 1 is a side elevation of a dolly according to the invention;

FIGS. 2 and 3 are front and rear views, respectively, of the dolly;

FIG. 4 is a top plan view thereof;

FIG. 5 is a side elevation of another embodiment of the invention;

FIGS. 6 and 7 are front and rear views, respectively, thereof, and

FIG. 8 is a top plan view of the dolly of FIG. 5.

Referring now to the drawing FIGS. 1 to 4, the illustrated dolly 10 comprises a relatively thin walled bottomless box-like structure of any suitable rigid material such as a sheet metal, but preferably of a plastic. This structure includes the side walls 11 and 12, rear wall 13 and front wall 14. Close to that front wall an axle 15 is secured in reinforcements 16, 17 of the side walls, through which the axle extends to form stub axles 18 and 19. On these stub axles, rollers or little wheels 20, 21 respectively, are rotatably mounted. It is, of course, possible too to secure the rollers to the axle 15 and journal the latter rotatably in the side walls and the reinforcements 16 and 17. At the upper end of the rear wall a hand grip is provided by a recess 22. Two tires of different sizes, namely a large tire 23 and a small tire 24 are indicated by dot and dash lines, as positioned on the dolly.

FIG. 1 shows the dolly in its position when held by the user to push it ahead with a tire thereon. Regardless whether a large tire or a small tire is to be transported, the tire will be supported at one point by the rear wall 13 and at another point on the axle 15. In order to render this possible it is necessary that the supports are spaced from each other less than the diameter $d$ of the small tire but at least the length of the chord of a quadrant of a circle equal in diameter to the large tire, which chord is indicated at $c$. It will also be noted that in the position of FIG. 1 the rear wall 13 is outwardly inclined with respect to a vertical indicated at $v$ whereas the front wall is substantially horizontal. Furthermore, the upper edges of the side walls 11 and 12 may be arcuate or convex in their middle portion as shown at 25, and they extend approximately to the center $a$ of the aforementioned circle in order to prevent a tire from toppling sideways from the dolly. Now it will be clear that a tire on the dolly can be readily transported by holding the dolly at the grip 22 in the position of FIG. 1 and pushing it forward as it may be desired.

The embodiment illustrated in FIGS. 5 to 8 is a tire dolly the body of which is made of tubes of metal such as steel or aluminum. This body comprises the side tubes 30, 31 and the rear tube 32 with a handgrip 33 secured thereto. The side tubes and rear tube may be of one piece bent, as will be apparent from FIGS. 7 and 8. The free ends 34 and 35 of the side tubes are squeezed flat and reinforcements 36 and 37 are fixed to the outsides of those ends respectively. An axis 38 is passed through or journaled in the reinforced ends 34 and 35 as it has been described with respect to the axle 15 of the embodiment illustrated in FIGS. 1 to 4. Rollers 39 and 40 are also similar to the rollers 20 and 21 and either fixedly mounted on the axle if the latter is rotatable, or rotatably mounted on the free ends of the axle 38 if the latter is fixed in the reinforced ends of the side tubes 30 and 31. Tires 23 and 24 are also indicated in FIG. 5 and it will be seen that either one will be supported by the rear tube 32 and the axle 38 which are spaced from each other within the limits heretofore stated. It will further be noted that the side tubes 30, 31 are convexly bent upwards to hold a supported tire safely on the sides. In the preferred form of FIG. 5 the bend extends even beyond the axis $a$ of the larger tire 23.

It will be apparent to those skilled in the art that many alterations and modifications of the structure shown and described may be made without departure from the essence and spirit of the invention which for that reason shall not be limited but by the scope of the appended claims.

I claim:

1. A dolly for transporting a tire non-mounted or mounted on a car wheel, comprising two side members spaced from each other approximately but not less than the width of the largest tire to be transported with said dolly, a front tire-supporting member and a rear tire-supporting member, said two supporting members connecting said side members, and being spaced from each other a distance defining the chord of a quadrant of a circle equal in diameter to the largest tire to be transported with said dolly, said side members extending from said supporting members substantially to the center of said circle, a hand grip on said rear supporting member, a pair of stub axles projecting laterally outwards from said side members, respectively, close to said front supporting member, and a pair of rollers rotatably mounted on said stub axles, respectively.

2. A dolly as in claim 1 wherein said rear supporting member is in a raised position relatively to said front supporting member when the user is holding the grip for pushing the dolly with the tire thereon.

3. A dolly as in claim 1 wherein said front supporting member is an axle extending through the lower front ends of said side members and including said stub axles.

4. A dolly for transporting a tire non-mounted or mounted on a car wheel comprising a body substantially in the form of a bottomless box having side walls, a front wall and a rear wall for receiving therebetween a tire to be transported, said front and rear walls being outwardly inclined in respect to each other, an axle extending through said side walls close to said front wall and forming stub axles laterally outside said side walls, respectively, said rear wall and said axle constituting supporting members for said tire, the supporting points of said members being spaced from each other a distance defining the chord of a quadrant of a circle equal in diameter to the largest tire to be transported, said side walls extending from said supporting members substantially to the center of said circle, a hand grip being provided near the top of said rear wall, and a pair of rollers mounted on said stub axles, respectively wherein when the user is holding said hand grip for pushing said dolly with the tire therein, the rear wall is inclined sightly outwardly with respect to the vertical and the front wheel is substantially horizontal.

5. A dolly for transporting a tire non-mounted or mounted on a car wheel, comprising a tubular frame including two side members and a rear member connecting said side members and constituting a first supporting member for a tire to be transported, a hand grip secured to said rear member which is on a higher level than the free ends of said side members when said grip is held by the user for pushing said dolly, an axle connecting said free ends of said side members and extending laterally outwards therefrom, said axle constituting a second supporting member for said tire, said supporting members being spaced from each other a distance defining the chord of a quadrant of a circle equal in diameter to the largest tire to be transported, and said side members being upwardly arched to approximately slightly beyond the center of said circle.

References Cited in the file of this patent

UNITED STATES PATENTS

| | | |
|---|---|---|
| 1,452,003 | Richardson | Apr. 17, 1923 |
| 2,198,438 | Knapp | Apr. 17, 1940 |
| 2,442,804 | Morris | May 15, 1951 |